(12) United States Patent
Wakabayashi et al.

(10) Patent No.: US 12,074,338 B2
(45) Date of Patent: Aug. 27, 2024

(54) BATTERY PACK

(71) Applicant: SANYO Electric Co., Ltd., Osaka (JP)

(72) Inventors: Takeaki Wakabayashi, Hyogo (JP); Kensaku Takeda, Tokushima (JP)

(73) Assignee: Panasonic Energy Co., Ltd., Osaka (JP)

( * ) Notice: Subject to any disclaimer, the term of this patent is extended or adjusted under 35 U.S.C. 154(b) by 438 days.

(21) Appl. No.: 17/422,730

(22) PCT Filed: Dec. 9, 2019

(86) PCT No.: PCT/JP2019/048017
§ 371 (c)(1),
(2) Date: Jul. 13, 2021

(87) PCT Pub. No.: WO2020/153018
PCT Pub. Date: Jul. 30, 2020

(65) Prior Publication Data
US 2022/0123428 A1     Apr. 21, 2022

(30) Foreign Application Priority Data

Jan. 25, 2019  (JP) .................................. 2019-011548

(51) Int. Cl.
*H01M 50/367*   (2021.01)
*H01M 10/0525*  (2010.01)
(Continued)

(52) U.S. Cl.
CPC ..... *H01M 50/367* (2021.01); *H01M 10/0525* (2013.01); *H01M 50/213* (2021.01); *H01M 50/24* (2021.01); *H01M 50/247* (2021.01)

(58) Field of Classification Search
CPC .. H01M 50/367; H01M 50/213; H01M 50/24; H01M 50/247; H01M 50/204; H01M 50/358; H01M 50/202; H01M 50/35
See application file for complete search history.

(56) References Cited

U.S. PATENT DOCUMENTS

2007/0009794 A1* 1/2007 Takami ................. H01M 4/505
                                                                429/223
2012/0164490 A1   6/2012 Itoi et al.
(Continued)

FOREIGN PATENT DOCUMENTS

CN     102473884 A    5/2012
CN     207409556 U    5/2018
(Continued)

OTHER PUBLICATIONS

The Extended European Search Report dated Feb. 23, 2022, issued in counterpart EP Application No. 19911084.2. (10 pages).
(Continued)

*Primary Examiner* — Matthew W Van Oudenaren
(74) *Attorney, Agent, or Firm* — WHDA, LLP

(57) ABSTRACT

A battery pack includes battery cell including the exhaust valve that opens when an internal pressure exceeds a set pressure and case housing battery cell. Case includes inner case housing battery cell and outer case incorporating inner case, inner case includes a plurality of inner smoke vent holes through which the exhaust gas ejected from the exhaust valve passes, and outer case includes a plurality of outer smoke vent holes through which the exhaust gas including passed through inner smoke vent holes passes. In a state where inner case is disposed in outer case, inner smoke vent holes and outer smoke vent holes are disposed at positions not facing each other, and inner smoke vent holes and outer smoke vent holes are opened at positions allowing the exhaust gas to pass in different directions.

14 Claims, 6 Drawing Sheets

(51) Int. Cl.
*H01M 50/213* (2021.01)
*H01M 50/24* (2021.01)
*H01M 50/247* (2021.01)

(56) References Cited

U.S. PATENT DOCUMENTS

2014/0227570 A1    8/2014    Hoshi et al.
2016/0204404 A1*   7/2016    Shimizu .............. H01M 50/342
                                                     429/82

FOREIGN PATENT DOCUMENTS

| JP | 2001-196039 | 7/2001 |
| JP | 2016-035817 A | 3/2016 |
| JP | 2018-195538 | 12/2018 |

OTHER PUBLICATIONS

International Search Report of PCT application No. PCT/JP2019/048017 dated Mar. 10, 2020.
Office Action dated Jan. 10, 2024, issued in counterpart CN application No. 201980089206.7, with English translation. (8 pages).
English Translation of Chinese Office Action dated May 31, 2024, issued in counterpart CN application No. 201980089206.7. (4 pages).

* cited by examiner

BATTERY PACK

CROSS-REFERENCE TO RELATED APPLICATIONS

This application is a U.S. national stage application of the PCT International Application No. PCT/JP2019/048017 filed on Dec. 9, 2019, which claims the benefit of foreign priority of Japanese patent application No. 2019-011548 filed on Jan. 25, 2019, the contents all of which are incorporated herein by reference.

TECHNICAL FIELD

The present invention relates to a battery pack that houses a chargeable battery in an exterior case.

BACKGROUND ART

In recent years, a battery pack used as a power source of a portable electric device has been further required to have high output, and a nonaqueous electrolyte secondary battery such as a lithium ion battery having excellent efficiency per unit volume has been adopted. Although the lithium ion battery has high output, an internal pressure may increase for some reason. In order to ensure safety against an increase in internal pressure of the battery, an exhaust valve that is opened at a set pressure to prevent rupture is provided. When the exhaust valve is opened, the battery is in an abnormal heat generation state, and a high-temperature gas is forcefully ejected from the exhaust valve. A battery pack in which a smoke vent hole is provided in an exterior case for discharging an exhaust gas discharged from an exhaust valve to outside has been developed.

CITATION LIST

Patent Literature

PTL 1: Unexamined Japanese Patent Publication No. 2001-196039

SUMMARY OF THE INVENTION

In the battery pack disclosed in PTL 1, a smoke vent hole is provided at a corner of an exterior case, and an exhaust gas ejected from an exhaust valve is quickly discharged to outside. In this battery pack, it is difficult to safely discharge high-temperature exhaust gas forcefully ejected from a battery cell to outside. In particular, since the exhaust gas ejected from the exhaust valve of the lithium ion battery as a nonaqueous electrolyte secondary battery is ejected at an abnormally high temperature of 400° C. or higher and forcefully, the exhaust gas thermally melts the exterior case, and the exhaust gas ejected to outside of the case at high temperature cannot ensure sufficient safety due to smoking, ignition, and the like. Further, a flame generated in the exterior case is released to outside of the case from a hole in the exterior case, and thus safety cannot be further ensured.

The present invention has been developed in order to prevent the above adverse effects. A main object of the present invention is to provide a battery pack that ensures safety by suppressing adverse effects and flames caused by a high-temperature exhaust gas ejected from an exhaust valve in an open state from being released to outside of a case.

A battery pack of the present invention includes battery cell 1 including an exhaust valve that opens when an internal pressure exceeds a set pressure and case 2 housing battery cell 1. Case 2 includes inner case 20 housing battery cell 1 and outer case 31 incorporating inner case 20, inner case 20 includes a plurality of inner smoke vent holes 27 through which the exhaust gas ejected from the exhaust valve passes, and outer case 30 includes a plurality of outer smoke vent holes 37 through which the exhaust gas including passed through inner smoke vent holes 27 passes. Case 2 includes inner case 20 disposed in outer case 30, an expansion gap 8 of the exhaust gas is provided between inner case 20 and outer case 30, the plurality of inner smoke vent holes 27 and the plurality of outer smoke vent holes 37 are connected via expansion gap 8, the exhaust gas including passed through the plurality of inner smoke vent holes 27 is guided to the plurality of outer smoke vent holes 37 through expansion gap 8, and the plurality of outer smoke vent holes 37 allows the exhaust gas to pass in a direction different from the plurality of inner smoke vent holes 27.

The battery pack described above prevents a high-temperature exhaust gas ejected from the exhaust valve in an open state from being forcefully ejected to outside of the exterior case, and secures preferable safety. This is because, in the above battery pack, the case includes a double structure of the inner case and the outer case, the plurality of inner smoke vent holes through which the exhaust gas passes is opened in the inner case, and the plurality of outer smoke vent holes through which the exhaust gas including passed through the inner smoke vent holes passes is opened in the outer case, the expansion gap is provided between the inner case and the outer case, the inner smoke vent holes and the outer smoke vent holes are connected via the expansion gap, the exhaust gas including passed through the inner smoke vent holes is guided from the expansion gap to the outer smoke vent holes, and the outer smoke vent holes allow the exhaust gas to pass through in a direction different from the inner smoke vent holes and be discharged to outside.

In the battery pack including such a unique structure, the high-temperature exhaust gas ejected from the exhaust valve is dispersed to the plurality of inner smoke vent holes provided in the inner case, the exhaust gas is passed through the inner case and discharged to the expansion gap, the exhaust gas flowing into the expansion gap is guided from the expansion gap to the plurality of outer smoke vent holes, and the outer smoke vent holes allow the exhaust gas to pass in a direction different from the inner smoke vent holes and to be exhausted to outside.

In the battery pack discharging the exhaust gas to outside of the case in the above state, the exhaust gas ejected from the battery cell is dispersed inside the inner case and passed through the plurality of inner smoke vent holes to be reduced in energy. Further, the exhaust gas is ejected from the inner smoke vent holes to the expansion gap to be adiabatically expanded and lowered in temperature. Then, the exhaust gas ejected from the inner smoke vent holes is collided with the inner surface of the outer case, redirected, diffused, and reduced in energy. After that, the exhaust gas is passed through the plurality of outer smoke vent holes from the expansion gap to be further reduced in energy and exhausted to outside of the case.

In the battery pack described above, the energy is reduced by a passage resistance of the gas through the inner smoke vent holes and the outer smoke vent holes, the exhaust gas is adiabatically expanded when the exhaust gas is ejected from the inner smoke vent holes to the expansion gap to include lower temperature, and further, the gas is dispersed, collided, and redirected at each part of a passage. Further, a path of the exhaust gas until the exhaust gas is discharged from the exhaust valve to outside of the case is lengthened, and the exhaust gas is discharged to outside of the case. Therefore, the high-temperature exhaust gas ejected from the exhaust gas can be safely exhausted without being ignited outside of the case.

DESCRIPTION OF EMBODIMENTS

Figure 1:
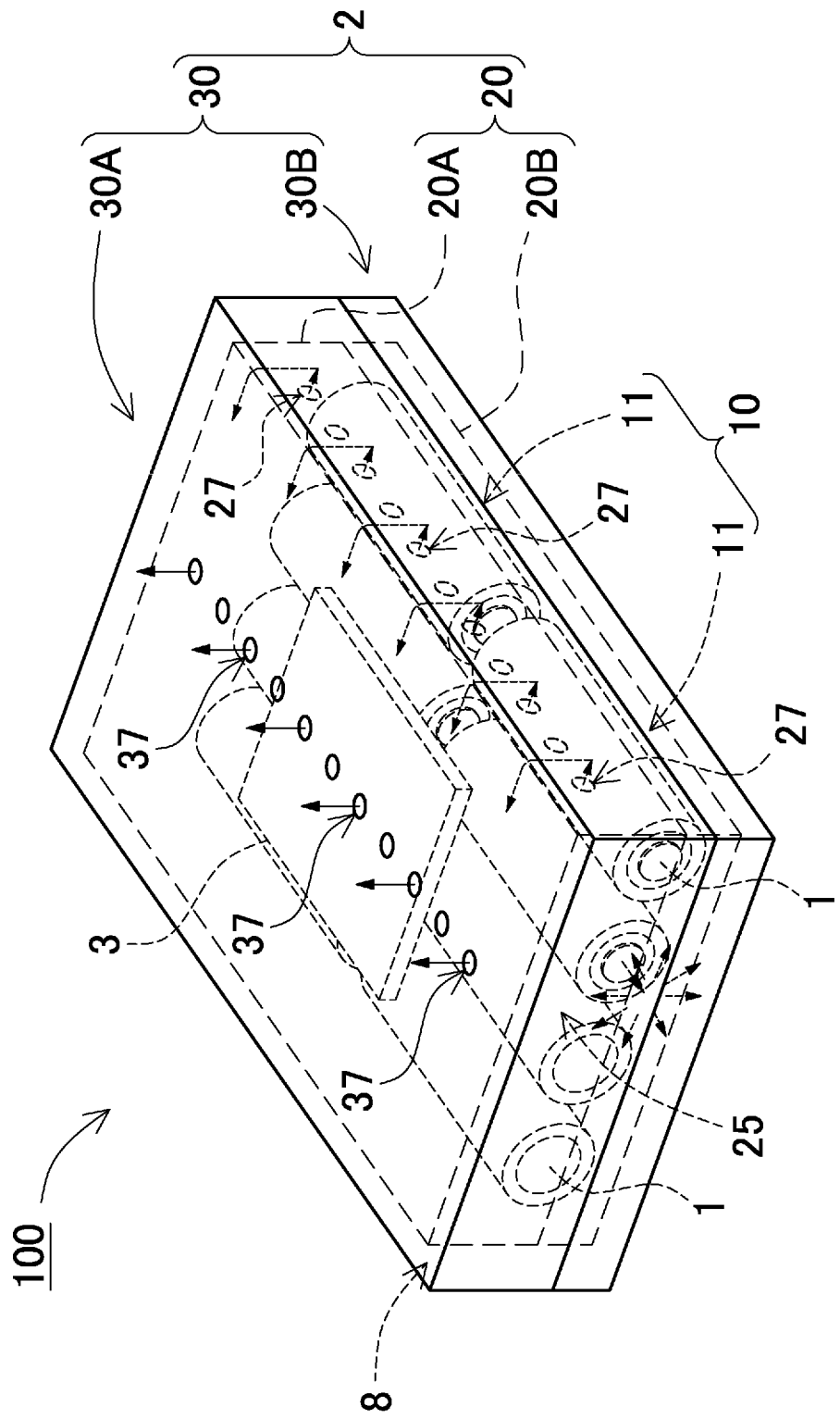
FIG. 1 is a schematic perspective view of an internal structure of a battery pack according to a first exemplary embodiment of the present invention.

A first aspect of the present invention is a battery pack including a battery cell including an exhaust valve that opens when an internal pressure exceeds a set pressure, and a case that houses the battery cell, in which the case includes an inner case that houses the battery cell and an outer case that incorporates the inner case, the inner case includes a plurality of inner smoke vent holes through which exhaust gas ejected from the exhaust valve passes, and the outer case includes a plurality of outer smoke vent holes through which the exhaust gas including passed through the plurality of inner smoke vent holes passes. The case includes the inner case disposed in the outer case, an expansion gap of the exhaust gas is provided between the inner case and the outer case, the plurality of inner smoke vent holes and the plurality of outer smoke vent holes are connected via the expansion gap, the exhaust gas including passed through the plurality of inner smoke vent holes is guided to the plurality of outer smoke vent holes through the expansion gap, and the plurality of outer smoke vent holes allows the exhaust gas to pass in a direction different from the plurality of inner smoke vent holes.

In a second aspect of the present invention, the inner case and the outer case include a rectangular parallelepiped shape, and the plurality of inner smoke vent holes and the plurality of outer smoke vent holes are opened at positions where the exhaust gas is exhausted in directions orthogonal to each other.

In a third aspect of the present invention, the inner case and the outer case include a box shape including a rectangular shape in plan view, each of the inner case and the outer case includes a rectangular parallelepiped shape provided with a peripheral wall around a surface plate including a rectangular shape, the plurality of inner smoke vent holes is opened in the peripheral wall of the inner case, and the plurality of outer smoke vent holes is opened in the surface plate of the outer case.

In a fourth aspect of the present invention, the inner case and the outer case include a box shape including a rectangular shape in plan view, each of the inner case and the outer case includes a rectangular parallelepiped shape provided with a peripheral wall around a surface plate including a rectangular shape, the plurality of inner smoke vent holes is opened in the surface plate of the inner case, and the plurality of outer smoke vent holes is opened in the peripheral wall of the outer case.

In a fifth aspect of the present invention, the inner case and the outer case include a box shape including a rectangular shape in plan view, each of the inner case and the outer case includes a rectangular parallelepiped shape provided with a peripheral wall around a rectangular surface plate, the peripheral wall includes side walls on both sides extending in a longitudinal direction of the surface plate and end walls orthogonal to the side walls, the plurality of inner smoke vent holes is opened in the end walls of the inner case, and the plurality of outer smoke vent holes is opened in the side walls of the outer case.

In a sixth aspect of the present invention, the inner case and the outer case include a box shape including a rectangular shape in plan view, each of the inner case and the outer case includes a rectangular parallelepiped shape provided with a peripheral wall around a rectangular surface plate, the peripheral wall includes side walls on both sides extending in a longitudinal direction of the surface plate and end walls orthogonal to the side walls, the plurality of inner smoke vent holes is opened in the side walls of the inner case, and the plurality of outer smoke vent holes is opened in the end walls of the outer case.

In a seventh aspect of the present invention, the plurality of inner smoke vent holes and the plurality of outer smoke vent holes include an inner diameter of 0.5 mm or more and 3 mm or less.

In an eighth aspect of the present invention, the battery cell is a nonaqueous electrolyte secondary battery. Further, in a ninth aspect of the present invention, the battery cell is a lithium ion battery.

Hereinafter, the present invention will be described in detail with reference to the drawings. In the following description, terms (for example, "upper", "lower", and other terms including these terms) indicating specific directions and positions are used as necessary, but these terms are used to facilitate understanding of the invention with reference to the drawings, and the technical scope of the present invention is not limited by the meanings of these terms. Parts denoted by the same reference marks in a plurality of drawings indicate the same or equivalent parts or members.

Further, the following exemplary embodiments illustrate specific examples of the technical idea of the present invention, and do not limit the present invention to the following. In addition, unless otherwise specified, dimensions, materials, shapes, relative arrangements, and the like of the components described below are not intended to limit the scope of the present invention, but are intended to be illustrative. The contents described in one exemplary embodiment and example are also applicable to other embodiments and examples. Note that the sizes, the positional relation, and the like of the components in each drawing may be exaggerated for clarifying the explanation.

First Exemplary Embodiment

Figure 2:
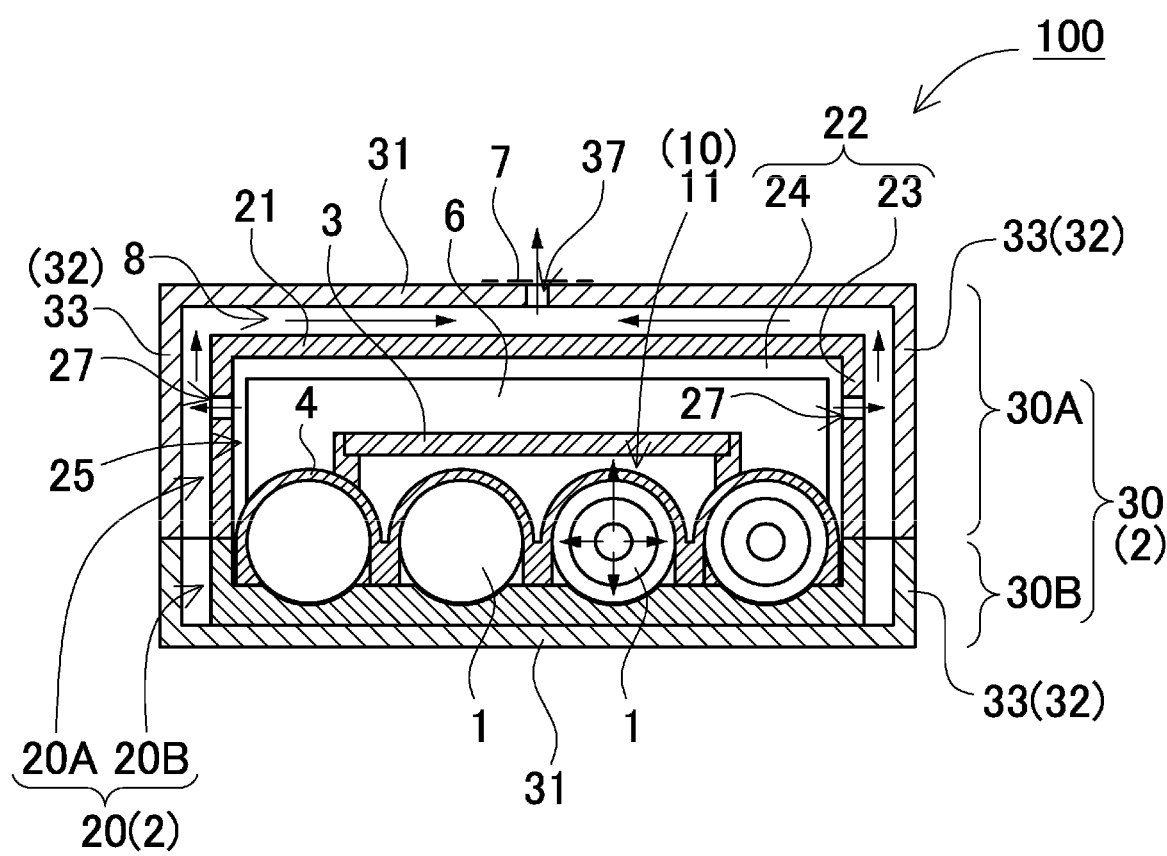
FIG. 2 is a vertical cross-sectional view of the battery pack according to the first exemplary embodiment of the present invention.
Figure 3:
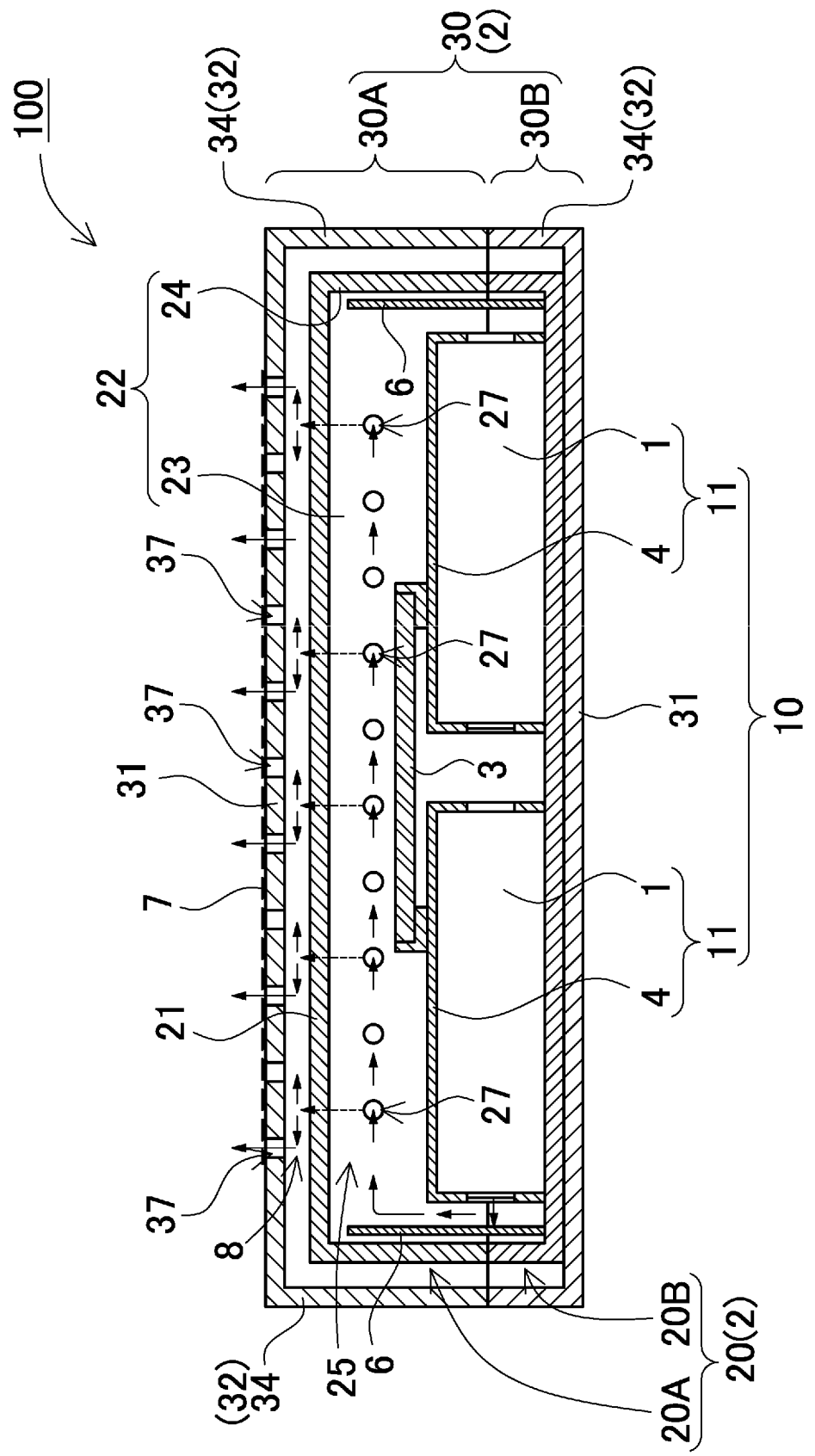
FIG. 3 is a vertical longitudinal sectional view of the battery pack according to the first exemplary embodiment of the present invention.

Battery pack 100 shown in FIGS. 1 to 3 includes a plurality of chargeable battery cells 1, circuit board 3 on which a protection circuit and the like of battery cells 1 are mounted, and case 2 housing battery cells 1 and circuit board 3.

(Battery Cell 1)

Battery cell 1 is a cylindrical battery. In the cylindrical battery, an electrode and an electrolytic solution are housed in a cylindrical metal case. The metal case has a sealed structure in which a sealing plate is airtightly fixed to an opening of an exterior can closing a bottom. The exterior can is manufactured by pressing a metal plate. The sealing plate is crimped to a peripheral edge of the opening of the exterior can with an insulating packing interposed therebetween to be airtightly fixed.

Although not illustrated, battery cell 1 is provided with an exhaust valve on the sealing plate in order to prevent damage due to an abnormally high internal pressure of the metal case. In the exhaust valve, the sealing plate is provided with an opening through which internal gas and the like are discharged in an open state. However, the battery cell may be provided with an exhaust valve and an opening of the exhaust valve at the bottom of the exterior can. When the internal pressure becomes higher than a set pressure, for example, 1.5 MPa, the exhaust valve is opened to prevent destruction of the metal case due to an increase in the internal pressure. The exhaust valve is opened in an abnormal state. Thus, in a state where the exhaust valve is opened, temperature of battery cell 1 is also significantly high. For this reason, the gas and electrolytic solution (ejected matter) discharged from the exhaust valve in an open state have an abnormally high temperature. In particular, in a battery pack in which battery cell 1 is a nonaqueous electrolyte secondary battery such as a lithium ion battery, exhaust gas has an abnormally high temperature of 400° C. or higher. Further, since the lithium ion battery is filled with a nonaqueous electrolytic solution, which may be ignited by being in contact with air if discharged to outside of the case at a high temperature, the lithium ion battery may have a further abnormally high temperature. In not only the lithium ion battery but also other chargeable batteries, the exhaust gas ejected from the exhaust valve in an open state has a high temperature, and it is therefore important to reduce energy of the exhaust gas and exhaust the exhaust gas to outside of the case for enhancing safety.

In battery pack 100 in FIGS. 1 to 3, a plurality of battery cells 1 is disposed at fixed positions in battery holder 4 to be disposed as battery block 10 in case 2. Battery block 10 includes two sets of battery assemblies 11. In battery assemblies 11, battery cells 1 are inserted into battery holder 4, and battery cells 1 are disposed at fixed positions. In battery holder 4, battery cells 1 are arranged in four rows in parallel to side walls 23 of case 2. Two sets of battery assemblies 11 are arranged in two stages in a longitudinal direction to constitute battery block 10 in which eight battery cells 1 are connected in series and in parallel in four rows and two stages. In each battery assembly 11, the openings of the exhaust valves of two battery cells 1 are disposed in the case so as to face end walls 24 of the case 2. In battery pack 100 in the drawing, each battery assembly 11 is constituted by four battery cells 1, battery block 10 is constituted by two sets of battery assemblies 11, and battery block 10 is disposed in the case. However, in the battery pack of the present invention, a number or connection state of battery cells 1 housed in the case is not specified.

(Circuit Board 3)

Circuit board 3 is provided with an electronic component (not shown) that is connected to battery cell 1 to achieve a protection circuit of battery cell 1. The protection circuit is a circuit that prevents overcharge and overdischarge of battery cells 1, a circuit that prevents overcurrent, or a circuit that interrupts current in a state where the temperature rises abnormally.

(Case 2)

Case 2 includes inner case 20 that houses battery cells 1 and outer case 30 in which inner case 20 is disposed. Inner case 20 and outer case 30 include plastic and are molded in a rectangular parallelepiped box shape having a rectangular shape in plan view. Battery block 10 is disposed in case 2 such that a longitudinal direction of battery cells 1 is a longitudinal direction of case 2. In battery pack 100, an ejection direction of the exhaust gas discharged from the openings of the exhaust valves of battery cells 1 is the longitudinal direction of case 2, and therefore, the exhaust gas is ejected toward end walls 24 of peripheral wall 22 of case 2.

Inner case 20 and outer case 30 are molded by a thermoplastic resin such as polycarbonate. Since polycarbonate is excellent in chemical resistance, inner case 20 including polycarbonate is stable against exhaust gas. Ideally, inner case 20 and outer case 30 are preferably molded by plastic having excellent heat resistance characteristics, but the cases having a two-layer structure do not have to be formed by heat-resistant plastic that is not thermally deformed or thermally melted by exhaust gas. This is because ejection time of the exhaust gas is as extremely short as only a few seconds, both inner case 20 and outer case 30 are not simultaneously thermally melted, and after inner case 20 is thermally melted, outer case 30 reduces the energy of the exhaust gas and exhausts the exhaust gas. This is because the ejection of the exhaust gas is completed before outer case 30 is thermally melted. Inner case 20 and outer case 30 can be mass-produced at low cost by injection-molding with a thermoplastic resin such as polycarbonate. However, the present invention does not specify the plastic of the cases. The cases can be molded using a thermoplastic resin having more excellent heat resistance, for example, a thermoplastic resin such as a nylon resin or a fluororesin, or alternatively, can be molded using a plastic having more excellent heat resistance characteristics, such as a silicon resin or a polyimide resin.

An outer shape of inner case 20 is smaller than an inner shape of outer case 30, and expansion gap 8 through which the exhaust gas passes is provided between inner case 20 and outer case 30. Inner case 20 incorporates battery cells 1 and circuit board 3. Inner case 20 and outer case 30 include upper cases 20A, 30A and lower cases 20B, 30B. Lower cases 20B, 30B and upper cases 20A, 30A are provided with peripheral walls 22, 32 around surface plates 21, 31 having a quadrangular shape, in the drawing, a rectangular shape. Lower cases 20B, 30B and upper cases 20A, 30A are connected to each other with opening end surfaces of peripheral walls 22, 32 as mating surfaces. Peripheral walls 22, 32 include side walls 23, 33 on both sides extending in a longitudinal direction of rectangular surface plates 21, 31 and end walls 24, 34 orthogonal to side walls 23, 33.

In inner case 20 illustrated in FIG. 3, heat resistant cover 6 is disposed inside each end wall 24 facing the openings of the exhaust valves. Heat resistant cover 6 is a heat resistant plate or sheet that withstands the temperature of the exhaust gas. Heat resistant cover 6 prevents the exhaust gas ejected from the exhaust valves from being directly ejected to each end wall 24, and scatters the exhaust gas in all directions. In inner case 20 in which end walls 24 are molded by a heat resistant material, the exhaust gas can be scattered around end walls 24 without providing heat resistant cover 6.

In battery pack 100 in FIGS. 1 to 3, heat resistant cover 6 is disposed on an inner surface of each end wall 24 of inner case 20, but heat resistant cover 6 may be omitted. In inner case 20 in which the heat resistant cover is not disposed, inner smoke vent holes 27 opened in end walls 24 are preferably disposed at positions not facing the openings of the exhaust valves.

In this battery pack, the exhaust gas ejected from an exhaust port is collided with end walls 24 and dispersed, and the dispersed gas is guided to inner smoke vent holes 27 and discharged. Then, the energy of the exhaust gas can be reduced, and the exhaust gas can flow into expansion gap 8 from inner smoke vent holes 27. Even when end walls 24 are thermally melted by the high-temperature ejected exhaust gas, there is a time lag before the end walls are thermally melted, and the ejection time of the exhaust gas is as short as a few seconds. Until the end walls are thermally melted, the exhaust gas is reduced in energy in inner smoke vent holes 27 and flowed into expansion gap 8. Since the ejection time of the exhaust gas is short, the time during which the gas is ejected after end walls 24 are thermally melted is extremely short. At this timing, the exhaust gas can be diffused in expansion gap 8, redirected, reduced in energy in outer smoke vent holes 37, and discharged to outside of outer case 30. The battery pack whose exhaust valves are opened is not used thereafter. Therefore, even in a battery pack in which the end walls of the inner case are thermally melted by the exhaust gas, safety can be secured by a structure capable of reducing the energy of the exhaust gas and discharging the exhaust gas ejected in an extremely short time after the thermal melting.

Inner case 20 is provided with a plurality of inner smoke vent holes 27 through which the exhaust gas ejected from the exhaust valves of battery cells 1 passes. Outer case 30 is provided with a plurality of outer smoke vent holes 37 through which the exhaust gas having passed through inner smoke vent holes 27 passes. As indicated by chain lines in FIGS. 2 and 3, outer smoke vent holes 37 are closed by label 7 in a state where label 7 is peeled off by the exhaust gas is attached and the exhaust valves are not opened. Inner smoke vent holes 27 and outer smoke vent holes 37 are provided at different positions of inner case 20 and outer case 30, respectively, and allow the exhaust gas to pass in further different directions. In battery pack 100 shown in a schematic perspective view of FIG. 1, inner smoke vent holes 27 are provided in side walls 23 of peripheral wall 22 of inner case 20, and outer smoke vent holes 37 are provided in surface plate 31 of outer case 30. The plurality of inner smoke vent holes 27 and the plurality of outer smoke vent holes 37 discharge the exhaust gas from a large number of smoke vent holes.

Since side walls 23 of inner case 20 and front surface plate 31 of outer case 30 are disposed in directions orthogonal to each other, inner smoke vent holes 27 provided in side walls 23 and outer smoke vent holes 37 provided in front surface plate 31 allow the exhaust gas to pass in directions orthogonal to each other. Battery pack 100 discharges the exhaust gas ejected from the exhaust valves of battery cells 1 to expansion gap 8 through inner smoke vent holes 27 of side walls 23 of peripheral wall 22 of inner case 20, guides the exhaust gas from inner smoke vent holes 27 to outer smoke vent holes 37 in expansion gap 8, and exhausts the exhaust gas from outer smoke vent holes 37 to outside of outer case 30.

Although a passage resistance of the exhaust gas can be increased by reducing a number and the inner diameters of inner smoke vent holes 27 and outer smoke vent holes 37, the exhaust gas cannot be smoothly exhausted to outside of the case if the number is small and the inner diameters are excessively small. Thus, in consideration of the number of smoke vent holes and the passage resistance of the gas, the inner diameters of the smoke vent holes are preferably from 1 mm to 3 mm inclusive, and the number of the smoke vent holes is preferably from 10 to 100 inclusive. The plurality of inner smoke vent holes 27 and the plurality of outer smoke vent holes 37 do not have to have the same inner diameter. For example, the inner diameter of the smoke vent holes having a short gas path to the exhaust valve can be made larger or smaller than the inner diameter of the smoke vent holes having a long gas path to the exhaust valve. A battery pack in which the inner diameter of the smoke vent holes having a short gas path is made larger than the inner diameter of the smoke vent holes having a long gas path can smoothly pass the exhaust gas. Meanwhile, a battery pack in which the inner diameter of the smoke vent holes having a short gas path is made smaller than the inner diameter of the smoke vent holes having a long gas path can uniformly pass the gas through the smoke vent holes while increasing the passage resistance of the gas and effectively reducing the energy.

Further, the inner diameters of inner smoke vent holes 27 and outer smoke vent holes 37 may have the same size. Alternatively, the inner diameter of inner smoke vent holes 27 may be larger than the inner diameter of outer smoke vent holes 37, or the inner diameter of inner smoke vent holes 27 may be smaller than the inner diameter of outer smoke vent holes 37. By making the inner diameter of inner smoke vent holes 27 larger than the inner diameter of outer smoke vent holes 37, the gas can smoothly pass through the inner smoke vent holes. On the other hand, by making the inner diameter of the inner smoke vent hole 27 smaller than the inner diameter of outer smoke vent holes 37, the energy can be more effectively reduced. However, the inner diameters of the plurality of inner smoke vent holes 27 and the plurality of outer smoke vent holes 37 are set to optimum values in consideration of the number, and thus the number is increased to decrease the inner diameters, or the number is decreased to increase the inner diameters.

By increasing a width of expansion gap 8, the temperature can be effectively lowered by adiabatic expansion of the gas, and by narrowing the width of expansion gap 8, the passage resistance of the exhaust gas can be increased and the passage resistance of the gas can be increased. The width of expansion gap 8 is set to an optimum dimension in consideration of the number and the inner diameters of smoke vent holes, and is preferably from 1 mm to 5 mm inclusive.

In battery pack 100, diffusion space 25 for exhaust gas is provided in inner case 2. In battery pack 100, the exhaust gas ejected from the exhaust valves is ejected to diffusion space 25 to reduce energy in diffusion space 25, and then the energy is reduced by inner smoke vent holes 27, expansion gap 8, and outer smoke vent holes 37 to be exhausted to outside of outer case 30. The smoke vent holes reduce kinetic energy of the exhaust gas by the passage resistance of the exhaust gas passing through. Expansion gap 8 adiabatically expands the gas to reduce temperature energy, further extends the gas path, collides, diffuses, and redirects the gas to reduce thermal energy and the kinetic energy, and exhausts the gas to outside of case 2.

The exhaust gas ejected from the exhaust valves into the inner case 20 flows in a direction indicated by arrows in FIGS. 1 to 3 and is exhausted to outside of case 2. The openings of the exhaust valves of battery cell 1 are disposed to face end walls 24 of inner case 20. The exhaust gas ejected from the exhaust valves is ejected toward end walls 24 of inner case 20. Since heat resistant cover 6 is disposed inside each end wall 24, the exhaust gas collides with heat resistant cover 6 and is scattered around. The exhaust gas that has collided with heat resistant cover 6 flows into diffusion space 25 and is diffused. As indicated by the arrows in the drawings, the exhaust gas flowing into diffusion space 25 collides with the inner surface of inner case 20, is dispersed, redirected, and exhausted from inner smoke vent holes 27 to expansion gap 8. The exhaust gas flowing into expansion gap 8 is adiabatically expanded, collided, diffused, redirected, reduced in energy, and then further reduced in energy by outer smoke vent holes 37, and exhausted to outside of case 2. The structure in which the exhaust gas is reduced in energy and exhausted to outside of case 2 can suppress adverse effects such as ignition outside case 2 and improve safety.

Second Exemplary Embodiment

Figure 4:
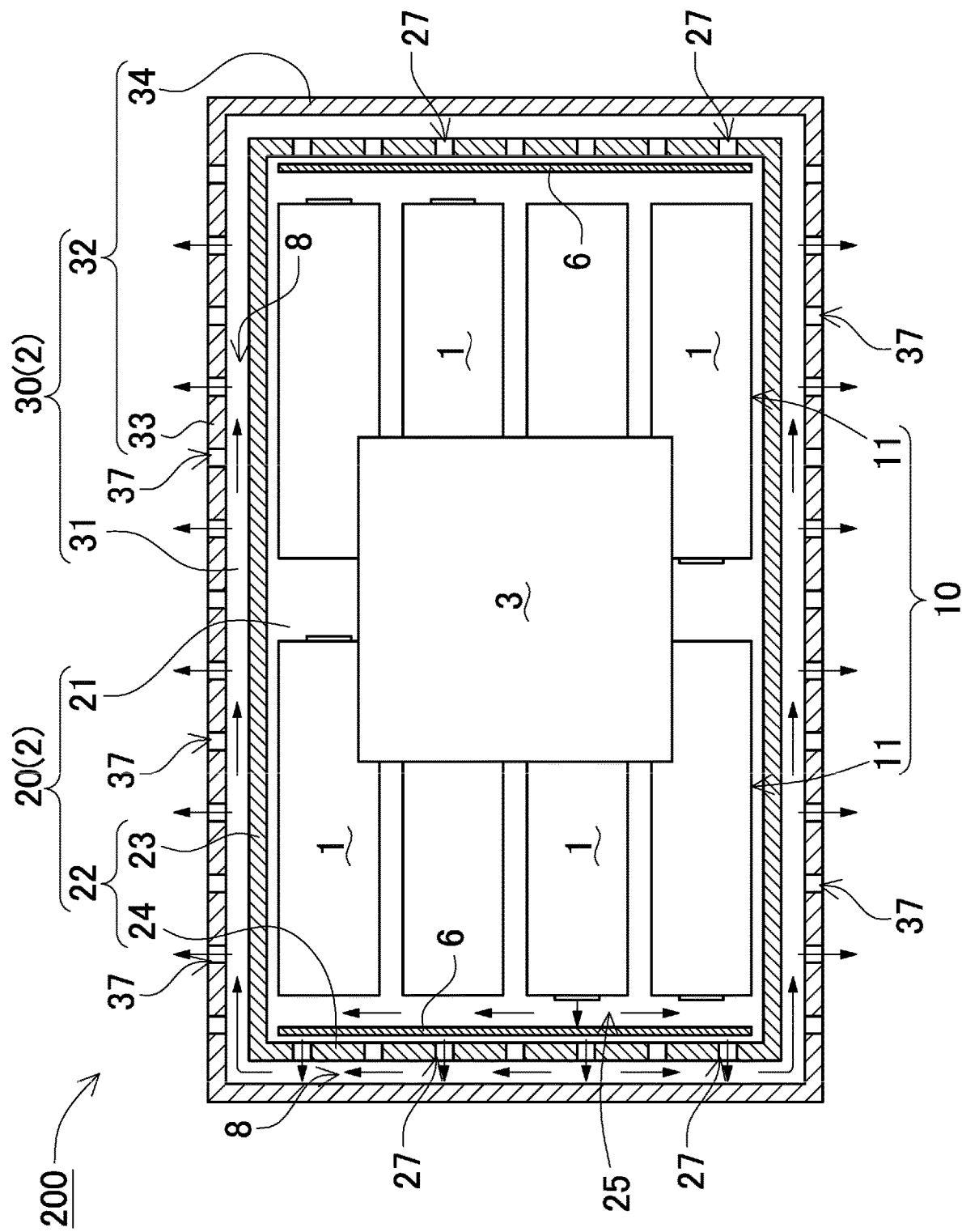
FIG. 4 is a schematic horizontal cross-sectional view of an internal structure of a battery pack according to a second exemplary embodiment of the present invention.

In battery pack 200, as shown in a schematic horizontal cross-sectional view of FIG. 4, inner smoke vent holes 27 are provided in end walls 24 of inner case 20, and outer smoke vent holes 37 are provided in side walls 33 of outer case 30. In battery pack 200, outer smoke vent holes 37 are provided in side walls 33 of outer case 30 having a larger area than end walls 34, and the gas can be diffused to a large area and smoothly discharged to outside of case 2. In battery pack 200, the exhaust gas ejected from the exhaust valves into inner case 20 is ejected from inner smoke vent holes 27 provided in end walls 24 of inner case 20 to expansion gap 8 to be adiabatically expanded, and the gas temperature is lowered. Further, in expansion gap 8, the exhaust gas is collided with the inner surface of end walls 34 of outer case 30, dispersed, redirected and reduced in energy in outer case 30, and exhausted from outer smoke vent holes 37 provided in side walls 33 of outer case 30 to outside of case 2 in a wide area. Battery pack 200 has a structure in which the exhaust gas is reduced in energy to a low level, dispersed over a wide area of the surface of outer case 30, and exhausted to outside of case 2, and this structure suppresses adverse effects such as ignition outside case 2 and improves safety.

Third Exemplary Embodiment

Figure 5:
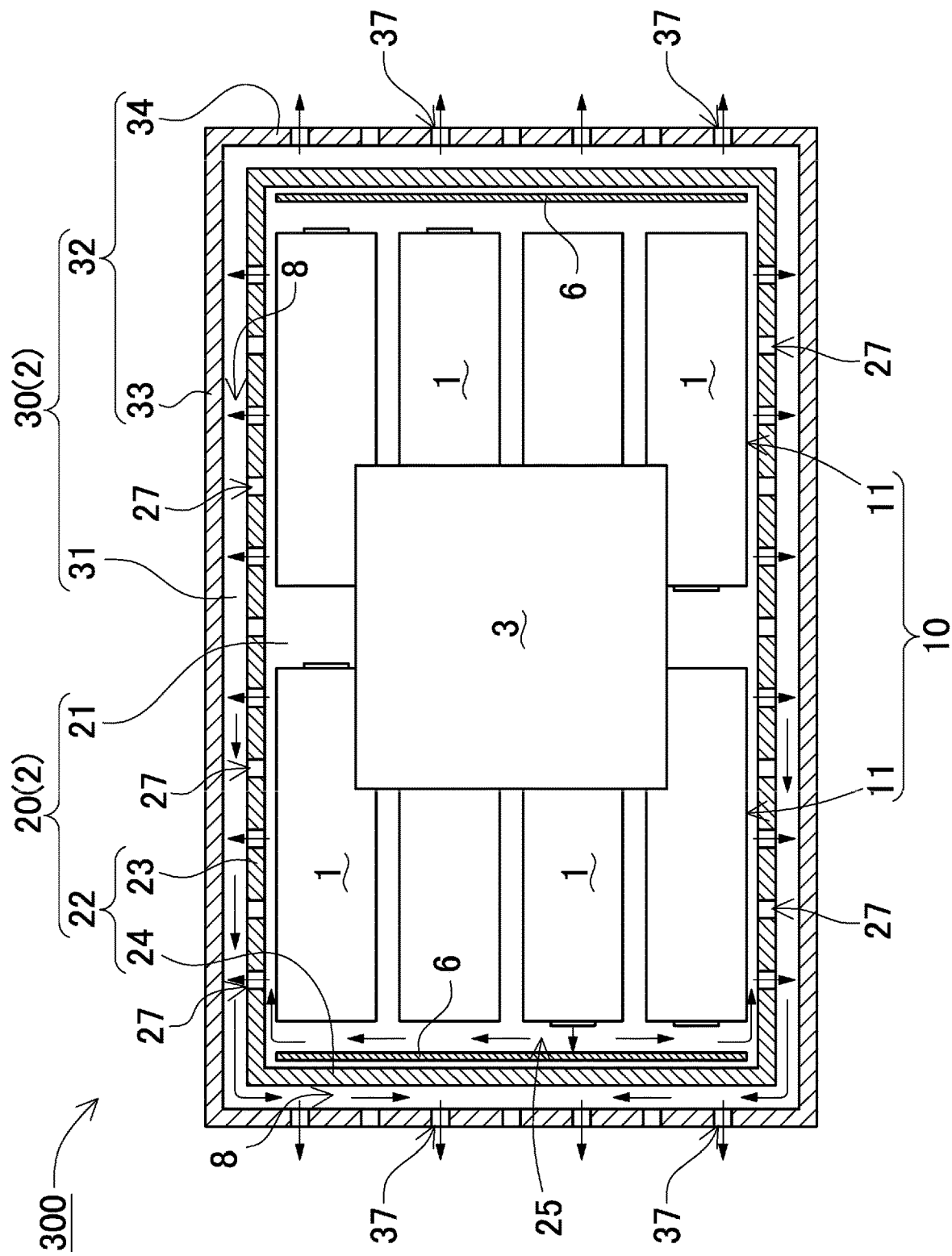
FIG. 5 is a schematic horizontal cross-sectional view of an internal structure of a battery pack according to a third exemplary embodiment of the present invention.

In battery pack 300, as shown in a schematic horizontal cross-sectional view of FIG. 5, inner smoke vent holes 27 are provided in side walls 23 of inner case 20, and outer smoke vent holes 37 are provided in end walls 34 of outer case 30. In battery pack 300, since a large number of inner smoke vent holes 27 can be provided in side walls 23 having a larger area than end walls 24, gas can be smoothly discharged from inner case 20 to expansion gap 8. In battery pack 300, the exhaust gas ejected from the exhaust valves into inner case 20 is ejected from inner smoke vent holes 27 provided in side walls 23 of inner case 20 to expansion gap 8 to be adiabatically expanded, and the gas temperature is lowered. Further, in expansion gap 8, the exhaust gas is collided with the inner surface of side walls 33 of outer case 30, dispersed, redirected and reduced in energy in outer case 30, and exhausted from outer smoke vent holes 37 provided in end walls 34 of outer case 30 to outside of case 2. Outer smoke vent holes 37 reduce the energy of the exhaust gas by the passage resistance and discharges the exhaust gas to outside of case 2. Battery pack 300 has a structure in which the exhaust gas is reduced in energy to a low level and exhausted to outside of case 2, and this structure suppresses adverse effects such as ignition outside case 2 and improves safety.

Fourth Exemplary Embodiment

Figure 6:
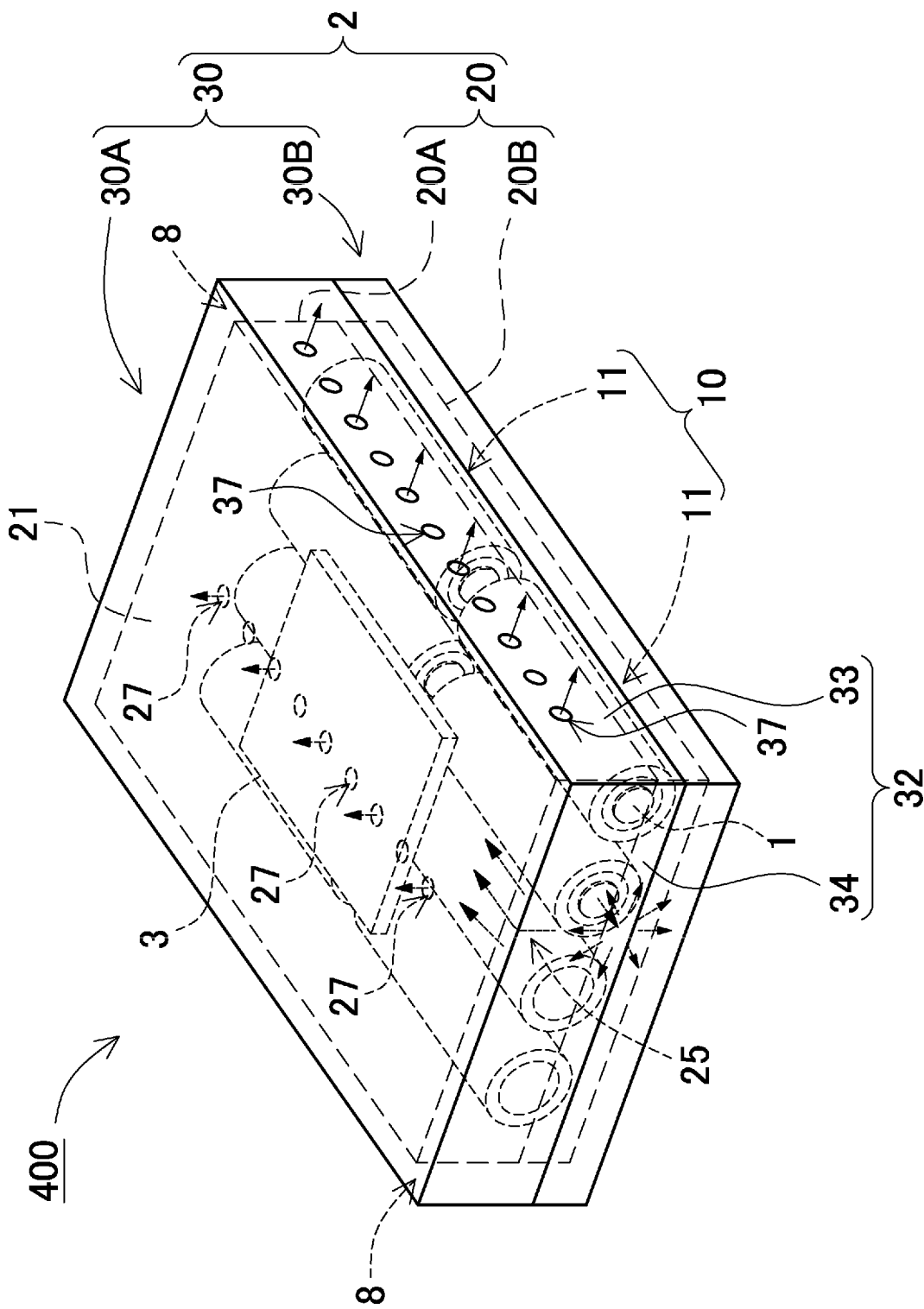
FIG. 6 is a schematic perspective view of an internal structure of a battery pack according to a fourth exemplary embodiment of the present invention.

As shown in a schematic perspective view of FIG. 6, in battery pack 400, inner smoke vent holes 27 are provided in surface plate 21 of inner case 20, and outer smoke vent holes 37 are provided in side walls 33 of outer case 30. In battery pack 400, since inner smoke vent holes 27 are provided in surface plate 21 of inner case 20 having a large area, the exhaust gas ejected from the exhaust valves can be dispersed in a large area and exhausted from inner case 20 to expansion gap 8. In this structure, since a large number of inner smoke vent holes 27 can be provided in surface plate 21 of inner case 20, inner smoke vent holes 27 can be reduced in size, and the exhaust gas can be smoothly discharged to expansion gap 8. The gas ejected from small inner smoke vent holes 27 to expansion gap 8 has a large effect of reducing the temperature by adiabatic expansion. Therefore, the gas with reduced temperature flows into outer smoke vent holes 37 to lower the temperature of the gas discharged to outside of case 2, and adverse effects such as ignition outside case 2 can be reliably prevented to improve safety.

INDUSTRIAL APPLICABILITY

The present invention can be effectively used for a battery pack that safely exhausts exhaust gas.

REFERENCE MARKS IN THE DRAWINGS

100, 200, 300, 400 battery pack
1 battery cell
2 case
3 circuit board
4 battery holder
6 heat resistant cover
7 label
8 expansion gap
10 battery block
11 battery assembly
20 inner case
20A upper case
20B lower case
21 surface plate
22 peripheral wall
23 side wall
24 end wall
25 diffusion space
27 inner smoke vent hole
30 outer case
30A upper case
30B lower case
31 surface plate
32 peripheral wall
33 side wall
34 end wall
37 outer smoke vent hole

The invention claimed is:
1. A battery pack comprising:
a battery cell including an exhaust valve that opens when an internal pressure of the battery cell exceeds a set pressure; and
a case that houses the battery cell, wherein
the case includes an inner case that houses the battery cell and
an outer case that incorporates the inner case,
the inner case includes a plurality of inner smoke vent holes through which exhaust gas ejected from the exhaust valve passes,
the outer case includes a plurality of outer smoke vent holes through which the exhaust gas having passed through the plurality of inner smoke vent holes passes,
the case includes the inner case disposed in the outer case,
an expansion gap of the exhaust gas is provided between the inner case and the outer case,
the plurality of inner smoke vent holes and the plurality of outer smoke vent holes are connected via the expansion gap,
the exhaust gas having passed through the plurality of inner smoke vent holes is guided to the plurality of outer smoke vent holes through the expansion gap,
the plurality of outer smoke vent holes guides the exhaust gas in a direction different from a direction in which the plurality of inner smoke vent holes guides the exhaust gas, and
the plurality of inner smoke vent holes and the plurality of outer smoke vent holes include an inner diameter of 0.5 mm or more and 3 mm or less.

2. The battery pack according to claim 1, wherein
the inner case and the outer case include a rectangular parallelepiped shape, and
the plurality of inner smoke vent holes and the plurality of outer smoke vent holes are opened at positions where the exhaust gas is exhausted in directions orthogonal to each other.

3. The battery pack according to claim 2, wherein
the inner case and the outer case include a box shape including a rectangular shape in plan view,
each of the inner case and the outer case includes a rectangular parallelepiped shape provided with a peripheral wall around a surface plate including a rectangular shape,
the plurality of inner smoke vent holes is opened in the peripheral wall of the inner case, and
the plurality of outer smoke vent holes is opened in the surface plate of the outer case.

4. The battery pack according to claim 2, wherein
the inner case and the outer case include a box shape including a rectangular shape in plan view,
each of the inner case and the outer case includes a rectangular parallelepiped shape provided with a peripheral wall around a surface plate including a rectangular shape,
the plurality of inner smoke vent holes is opened in the surface plate of the inner case, and
the plurality of outer smoke vent holes is opened in the peripheral wall of the outer case.

5. The battery pack according to claim 2, wherein
the inner case and the outer case include a box shape including a rectangular shape in plan view,
each of the inner case and the outer case includes a rectangular parallelepiped shape provided with a peripheral wall around a surface plate including a rectangular shape,
the peripheral wall includes side walls on both sides extending in a longitudinal direction of the surface plate and end walls orthogonal to the side walls,
the plurality of inner smoke vent holes are opened in the end walls of the inner case, and
the plurality of outer smoke vent holes are opened in the side walls of the outer case.

6. The battery pack according to claim 2, wherein
the inner case and the outer case include a box shape including a rectangular shape in plan view,
each of the inner case and the outer case includes a rectangular parallelepiped shape provided with a peripheral wall around a surface plate including a rectangular shape,
the peripheral wall includes side walls on both sides extending in a longitudinal direction of the surface plate and end walls orthogonal to the side walls,
the plurality of inner smoke vent holes are opened in the side walls of the inner case, and
the plurality of outer smoke vent holes are opened in the end walls of the outer case.

7. The battery pack according to claim 1, wherein the battery cell is a nonaqueous electrolyte secondary battery.

8. The battery pack according to claim 7, wherein the battery cell is a lithium ion battery.

9. A battery pack comprising:
a battery cell including an exhaust valve that opens when an internal pressure of the battery cell exceeds a set pressure; and
a case that houses the battery cell, wherein
the case includes
an inner case that houses the battery cell and
an outer case that incorporates the inner case,
the inner case includes a plurality of inner smoke vent holes through which exhaust gas ejected from the exhaust valve passes,
the outer case includes a plurality of outer smoke vent holes through which the exhaust gas having passed through the plurality of inner smoke vent holes passes,
the case includes the inner case disposed in the outer case,
an expansion gap of the exhaust gas is provided between the inner case and the outer case,
the plurality of inner smoke vent holes and the plurality of outer smoke vent holes are connected via the expansion gap,
the exhaust gas having passed through the plurality of inner smoke vent holes is guided to the plurality of outer smoke vent holes through the expansion gap,
the plurality of outer smoke vent holes guides the exhaust gas in a direction different from a direction in which the plurality of inner smoke vent holes guides the exhaust gas,
the inner case and the outer case include a rectangular parallelepiped shape,
the plurality of inner smoke vent holes and the plurality of outer smoke vent holes are opened at positions where the exhaust gas is exhausted in directions orthogonal to each other,
the inner case and the outer case include a box shape including a rectangular shape in plan view,
each of the inner case and the outer case includes a rectangular parallelepiped shape provided with a peripheral wall around a surface plate including a rectangular shape,
the peripheral wall includes side walls on both sides extending in a longitudinal direction of the surface plate and end walls orthogonal to the side walls,
the plurality of inner smoke vent holes are opened in the end walls of the inner case, and
the plurality of outer smoke vent holes are opened in the side walls of the outer case.

10. The battery pack according to claim 9, wherein the battery cell is a nonaqueous electrolyte secondary battery.

11. The battery pack according to claim 10, wherein the battery cell is a lithium ion battery.

12. A battery pack comprising:
a battery cell including an exhaust valve that opens when an internal pressure of the battery cell exceeds a set pressure; and
a case that houses the battery cell, wherein
the case includes
an inner case that houses the battery cell and
an outer case that incorporates the inner case,
the inner case includes a plurality of inner smoke vent holes through which exhaust gas ejected from the exhaust valve passes,
the outer case includes a plurality of outer smoke vent holes through which the exhaust gas having passed through the plurality of inner smoke vent holes passes,
the case includes the inner case disposed in the outer case,
an expansion gap of the exhaust gas is provided between the inner case and the outer case,
the plurality of inner smoke vent holes and the plurality of outer smoke vent holes are connected via the expansion gap,
the exhaust gas having passed through the plurality of inner smoke vent holes is guided to the plurality of outer smoke vent holes through the expansion gap,
the plurality of outer smoke vent holes guides the exhaust gas in a direction different from a direction in which the plurality of inner smoke vent holes guides the exhaust gas,
the inner case and the outer case include a rectangular parallelepiped shape,
the plurality of inner smoke vent holes and the plurality of outer smoke vent holes are opened at positions where the exhaust gas is exhausted in directions orthogonal to each other,
the inner case and the outer case include a box shape including a rectangular shape in plan view,
each of the inner case and the outer case includes a rectangular parallelepiped shape provided with a peripheral wall around a surface plate including a rectangular shape,
the peripheral wall includes side walls on both sides extending in a longitudinal direction of the surface plate and end walls orthogonal to the side walls,
the plurality of inner smoke vent holes are opened in the side walls of the inner case, and
the plurality of outer smoke vent holes are opened in the end walls of the outer case.

13. The battery pack according to claim 12, wherein the battery cell is a nonaqueous electrolyte secondary battery.

14. The battery pack according to claim 13, wherein the battery cell is a lithium ion battery.

* * * * *